United States Patent
Shikari et al.

(10) Patent No.: US 10,091,705 B1
(45) Date of Patent: Oct. 2, 2018

(54) AVOIDING DENIAL OF SERVICE

(71) Applicant: Apple Inc., Cupertino, CA (US)

(72) Inventors: Murtaza A. Shikari, Mountain View, CA (US); Srirang A. Lovlekar, Cupertino, CA (US); Srinivasan Nimmala, San Jose, CA (US); Lakshmi N. Kavuri, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/606,474

(22) Filed: May 26, 2017

(51) Int. Cl.
| | |
|---|---|
| *H04W 48/04* | (2009.01) |
| *H04W 76/18* | (2018.01) |
| *H04W 4/50* | (2018.01) |
| *H04W 76/02* | (2009.01) |
| *H04W 4/00* | (2018.01) |
| *H04W 48/18* | (2009.01) |
| *H04W 84/04* | (2009.01) |

(52) U.S. Cl.
CPC .......... *H04W 48/04* (2013.01); *H04W 4/001* (2013.01); *H04W 4/50* (2018.02); *H04W 48/18* (2013.01); *H04W 76/027* (2013.01); *H04W 76/18* (2018.02); *H04W 84/042* (2013.01)

(58) Field of Classification Search
CPC .. H04L 12/2697; H04W 16/18; H04W 24/00; H04W 24/06; H04W 24/08
See application file for complete search history.

(56) References Cited

U.S. PATENT DOCUMENTS

| | | | |
|---|---|---|---|
| 9,210,627 B1* | 12/2015 | Rao | H04W 76/027 |
| 9,414,298 B1* | 8/2016 | Pasupuleti | H04W 48/02 |
| 2008/0293407 A1 | 11/2008 | Cormier et al. | |
| 2010/0172297 A1* | 7/2010 | Amerga | H04W 48/16 370/328 |
| 2010/0265918 A1 | 10/2010 | Marinier et al. | |
| 2011/0207452 A1* | 8/2011 | Grob-Lipski | H04W 36/0033 455/423 |
| 2013/0107778 A1* | 5/2013 | Ryu | H04W 48/02 370/311 |
| 2014/0045509 A1 | 2/2014 | Parr | |

(Continued)

FOREIGN PATENT DOCUMENTS

| | | |
|---|---|---|
| CN | 101163318 B | 9/2010 |
| WO | WO2016081098 | 5/2016 |

*Primary Examiner* — Sharad Rampuria
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to techniques for avoiding denial of service in a wireless communication system. A wireless device may unsuccessfully attempt to obtain cellular service. Based at least in part on cause information for the unsuccessful attempt to obtain cellular service, and potentially also based at least in part on cause information for one or more previous unsuccessful attempts to obtain cellular service, the wireless device may selectively determine to disable one or more features at the wireless device, bar a cell on which the unsuccessful attempt to obtain cellular service is made, bar a public land mobile network on which the unsuccessful attempt to obtain cellular service is made, and/or bar a radio access technology according to which the unsuccessful attempt to obtain cellular service is made and perform a subsequent attempt to obtain cellular service.

18 Claims, 4 Drawing Sheets

(56) References Cited

U.S. PATENT DOCUMENTS

2016/0080990 A1\* 3/2016 Thiruvenkatachari ........................ H04W 36/0083 370/312
2016/0338009 A1 11/2016 Yang et al.

\* cited by examiner

AVOIDING DENIAL OF SERVICE

FIELD

The present application relates to wireless devices, including to apparatuses, systems and methods for avoiding denial of service in wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

As wireless communication technologies and wireless devices implementing those technologies are developed and updated over time, there can be potential for new or updated features, configurations, software, etc., to function improperly. While in some instances, this may have little to no effect on overall user experience and usability of a wireless device, in other instances, such improper function can cause a wireless device to crash or otherwise be unable to obtain service and may have a significant negative impact on user experience and usability of a wireless device. Accordingly, improvements in the field are desired.

SUMMARY

Embodiments are presented herein of apparatuses, systems, and methods for avoiding denial of service in wireless communication systems.

A cellular capable device could be in constant denial of service for any of a variety of reasons. Among various possibilities, a device could crash on power up when attempting to obtain service on a specific cell, carrier network, and/or radio access technology, or could crash during a specific type of cellular operation, or could lose cellular service or some subset of cellular operation without crashing.

In many instances, it may be the case that the cause of the denial of service may be avoidable. For instance, it may be caused by a misconfiguration or an intentional but insufficiently tested configuration with respect to a specific feature or set of features that can be disabled or modified in such a way that the device is still able to obtain cellular service. In various circumstances, the problem(s) may additionally or alternatively be specific to a certain cell, network, and/or radio access technology (RAT), such that barring the problem cell/network/RAT may allow the wireless device to obtain cellular service, albeit potentially from a more limited set of available cells/networks/RATs.

Accordingly, techniques are proposed herein for a wireless device to identify when repeated denial of service is occurring, to identify potential causes for the repeated denial of service, and to modify operation of the wireless device to attempt to avoid future denial of service while impacting operation of the wireless device in a relatively minimal manner.

For example, if repeated crashes or losses of service occur when a specific non-essential feature is used or operation occurs, the wireless device may attempt to obtain service with that feature disabled or while avoiding that operation. If that is unsuccessful or repeated crashes or losses of service occur and aren't associated with any common feature(s)/operation(s), but the repeated crashes or losses of service occur with a specific cell, the wireless device may bar the specific cell and attempt to obtain service on one or more other cells. If that is still unsuccessful or repeated crashes or losses of service occur and aren't associated with a single specific cell, but the repeated crashes or losses of service occur with a specific carrier (e.g., a specific public land mobile network associated with a carrier), the wireless device may bar the specific carrier and attempt to obtain service on one or more other carrier networks. Additionally or alternatively, if the repeated crashes or losses of service occur with a specific RAT, the wireless device may bar the specific RAT and attempt to obtain service using one or more other RATs.

Such techniques may help a wireless device to work around configuration problems, software bugs, rogue cells, and/or other problems in such a way that the wireless device may be able to obtain cellular service more frequently and/or more reliably than might otherwise occur, potentially leading to better user experience, emergency services (e.g., emergency calling, commercial mobile alert system, etc.) availability, and/or other benefits.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
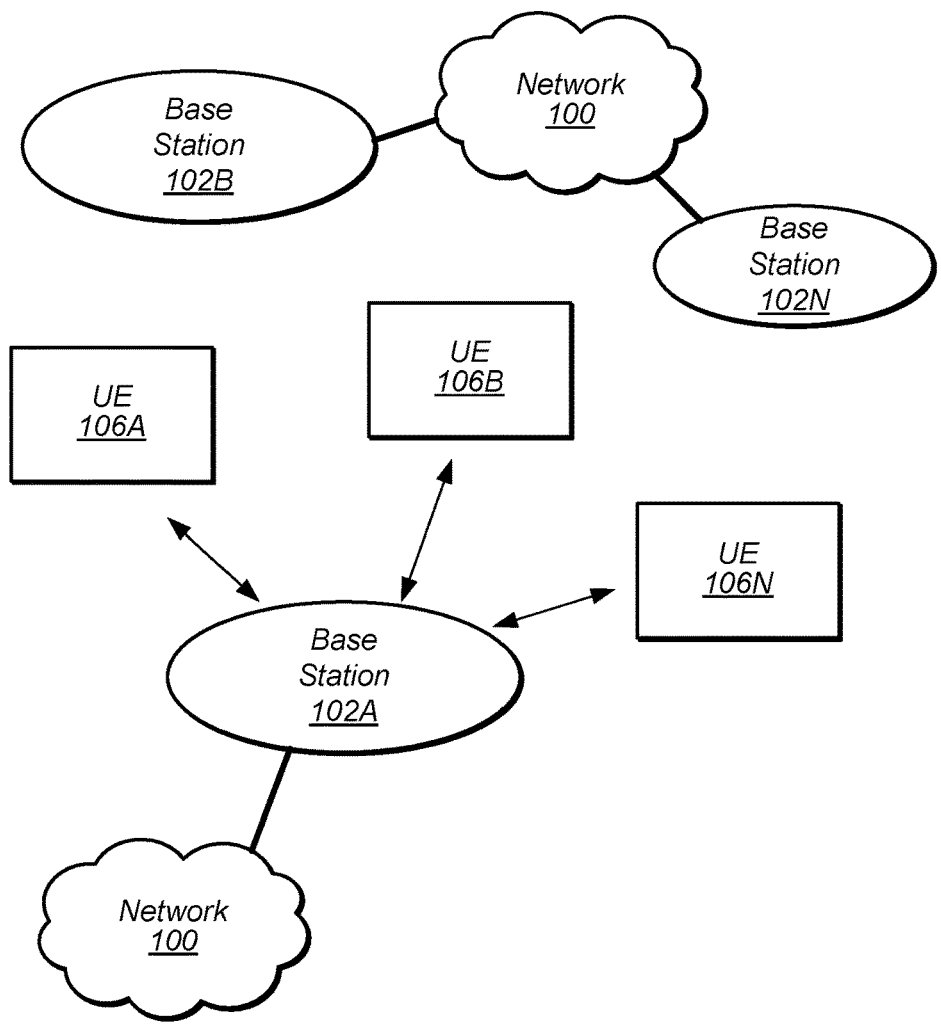
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial
Radio Access Network
LTE: Long Term Evolution
E-UTRAN: Evolved UMTS Radio Access Network or Evolved Universal Radio
Access Network
RRC: Radio Resource Control
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
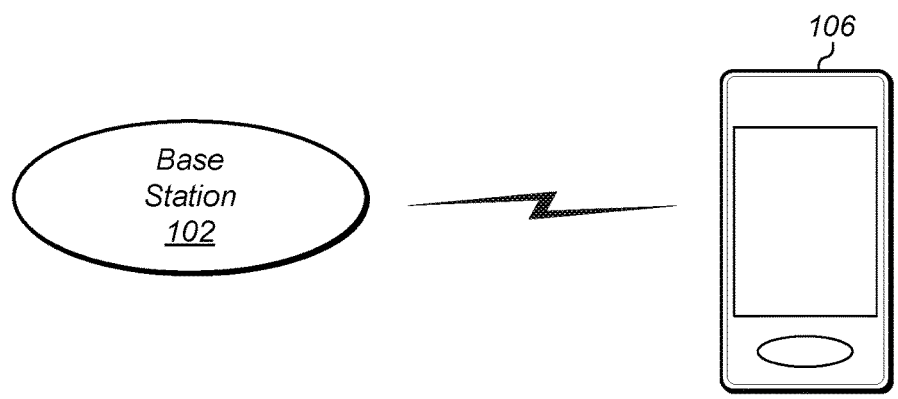
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for avoiding denial of service, e.g., according to the method of FIG. 5. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
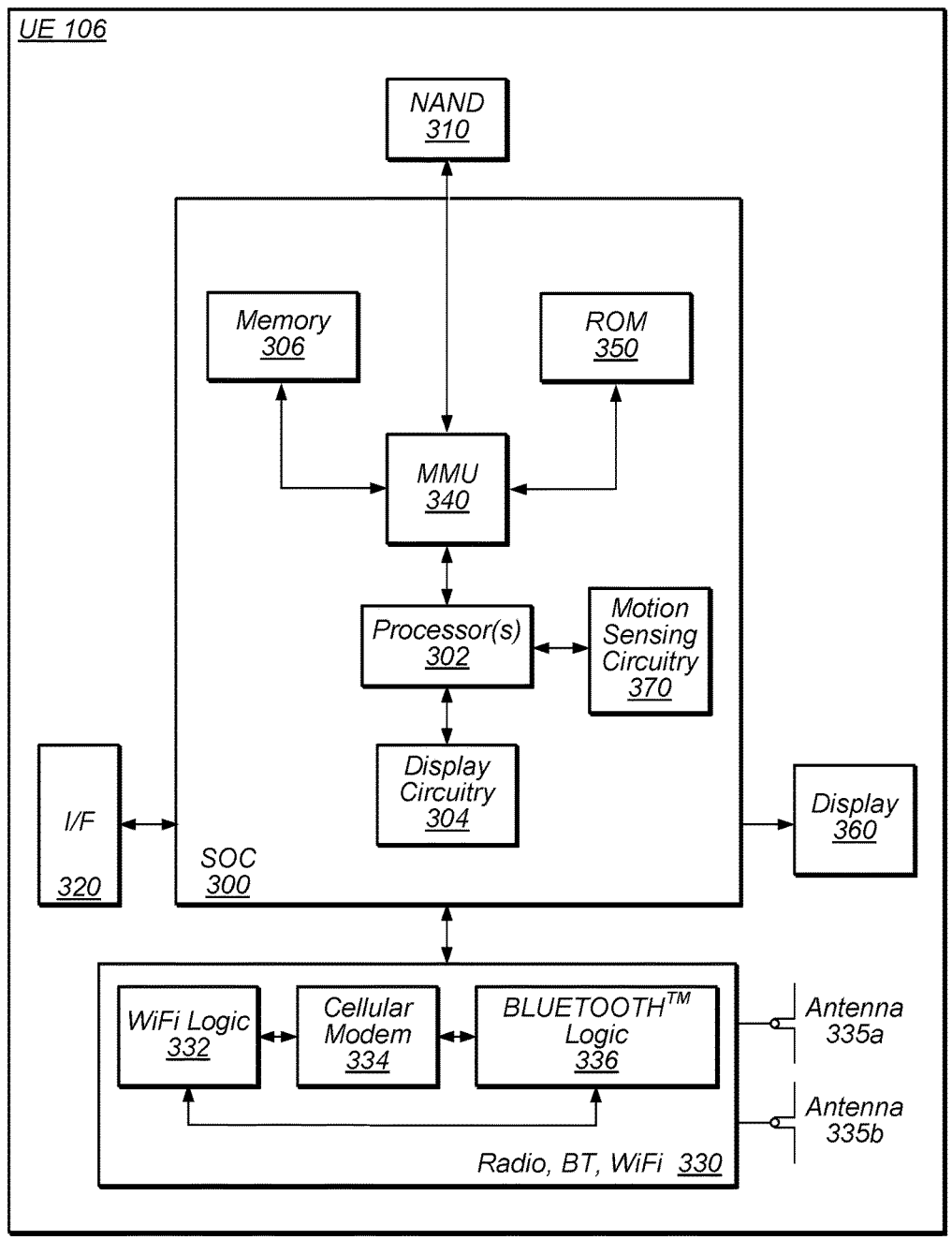
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies.

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
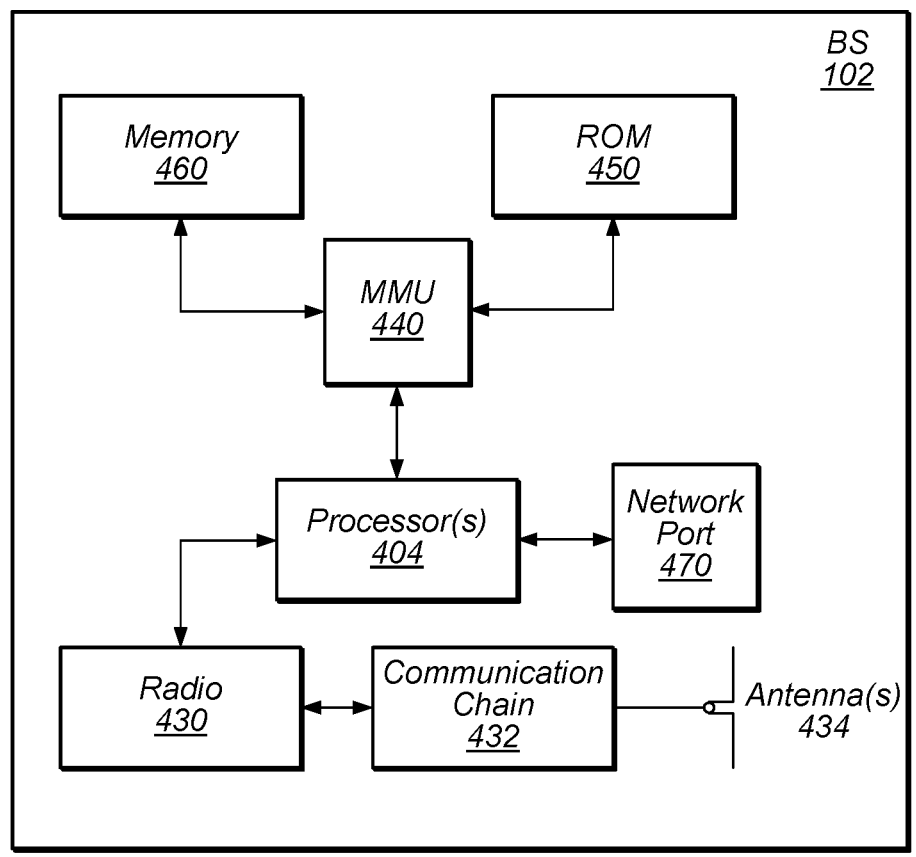
FIG. 4 illustrates an exemplary block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
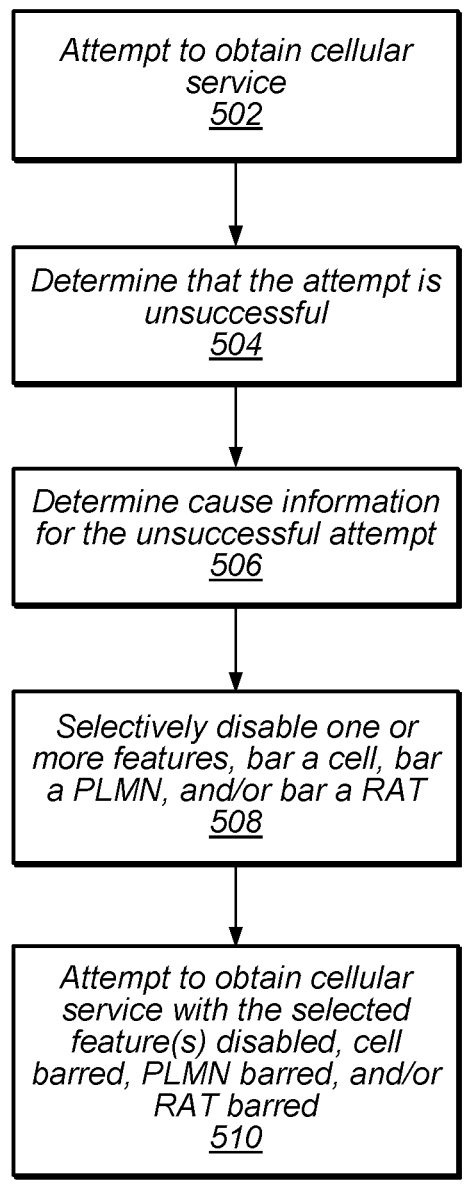
FIG. 5 is a communication flow diagram illustrating an exemplary method for avoiding denial of service, according to some embodiments.

FIG. 5—Avoiding Denial of Service

There are numerous possible reasons that a wireless device might not be able to obtain cellular service. In many instances, temporary or one-off problems may cause a wireless device to crash (e.g., fail) or otherwise lose service, but a subsequent attempt to regain cellular service may succeed without changing the parameters or general manner in which the wireless device is attempting to obtain wireless service.

In other cases, it may be possible for a wireless device to be unable to obtain cellular service (or for some subset of cellular operations to cause the wireless device to crash or lose service) repeatedly, resulting in the wireless device being in constant or near constant denial of service. For instance, a cellular network, or a specific cell in a cellular network, may configure a wireless device in a way that exposes a bug in the wireless device (e.g., as a result of misconfiguration or an intentional/valid but untested configuration of the wireless device by the network/cell), which may cause the wireless device to crash and lose service upon powering up and initially attempting to obtain service using the culpable cell/network/cellular technology or while accessing a specific cellular operation (e.g., such as initiation of registration, cellular voice calls, cellular data calls, etc.) using the culpable cell/network/cellular technology. As another possibility, the wireless device may also simply lose cellular service completely, or lose the ability to perform some specific cellular operation (e.g., such as voice calls, data calls, etc.) or some modem specific features (e.g., carrier aggregation, etc.), without crashing the device. Another possible cause for denial of service may include a malicious network intentionally trying to deny service to a user, e.g., by sending certain configurations/messages that could result in the device being unable to obtain cellular service for a potentially long duration. Other reasons for constant or near constant denial of service are also possible.

Such problems could have the potential to lead users to not be able to obtain cellular service for a potentially long duration. This could in turn lead to missed cellular calls, lack of cellular data access, and no cellular emergency services (e.g., emergency calls, commercial mobile alert system (CMAS), etc.) for the user.

However, in at least some instances, it may be possible to avoid such denial of service, e.g., by modifying the manner in which the wireless device attempts to obtain service or is generally configured to attempt to work around and potentially avoid the cause of the denial of service. FIG. 5 is a flowchart diagram illustrating one possible scheme for avoiding denial of service, at least according to some embodiments. The scheme shown in FIG. 5 may be used in conjunction with any of the computer systems or devices shown in the above Figures, among other devices. In various embodiments, some of the elements of the scheme shown may be performed concurrently, in a different order than shown, may be substituted for by other elements, or may be omitted. Additional elements may also be performed as desired. As shown, the scheme may operate as follows.

In 502, a wireless device may attempt to obtain cellular service. The attempt to obtain cellular service may be performed upon device power up or cellular modem power up (e.g., after turning off airplane mode), upon returning to a coverage area after being out-of-service, or under any of various other circumstances.

Attempting to obtain cellular service may include any or all of scanning various frequencies and/or frequency bands for cells, decoding synchronization and system information signals to acquire cell information, registering with a cellular network and attaching to a cell, establishing a radio resource control connection with a cell, and/or communicating data with a cell, among various possible operations.

In 504, it may be determined that the attempt to obtain cellular service is unsuccessful. The attempt may be unsuccessful for any of a variety of reasons, and may occur at any of various stages in the attempt to obtain cellular service. In some embodiments, it may be determined that an unsuccessful attempt has occurred as a result of the wireless device crashing while attempting to obtain cellular service. Note that as a further possibility, the wireless device may have apparently successfully obtained cellular service, but may afterward (e.g., abruptly) lose cellular service, e.g., if the wireless device crashes during a particular cellular operation or while using a particular cellular feature.

In 506, cause information for the unsuccessful attempt may be determined. The cause information may relate to a specific operation or feature that was active when the unsuccessful attempt occurred. For example, the wireless device may store crash signature information indicating one or more activities, operations, or procedures actively occurring when a crash occurs, and/or may otherwise maintain trace information allowing the wireless device to determine one or more activities, operations, or procedures that may have been associated with the unsuccessful attempt. Additionally or alternatively, the wireless device may store information indicating a cell on which the unsuccessful attempt occurred, a carrier network (e.g., public land mobile network (PLMN)) on which the unsuccessful attempt occurred, and/or a radio access technology (RAT) in use when the unsuccessful attempt occurred, and may utilize this information in determining possible causes for the unsuccessful attempt.

At least in some instances, the cause information may further relate to one or more previous unsuccessful attempts to obtain cellular service, and/or additional cause information for one or more previous unsuccessful attempts to obtain cellular service may be stored/determined. For example, the wireless device may semi-statically store crash signature information and/or cell/PLMN/RAT information for each crash and/or other unsuccessful attempt to obtain cellular service for a certain period of time after each crash and/or other unsuccessful attempt to obtain cellular service.

In 508, the wireless device may selectively disable one or more features, bar a cell, bar a public land mobile network (PLMN), and/or bar a radio access technology (RAT), e.g., based on the unsuccessful attempt to obtain cellular service and the cause information for the unsuccessful attempt. Other previous unsuccessful attempts to obtain cellular service, along with associated cause information, may also be considered in determining how to modify the wireless device's operation, at least according to some embodiments.

Any of various techniques/algorithms may be used determined whether to disable one or more features, bar a cell, bar a PLMN, and/or bar a RAT. At least according to some embodiments, a progressively more aggressive approach may be used, such that targeted modifications (e.g., disabling one or more specific features or barring a specific cell) that may have a smaller overall impact on device performance/operation may be made initially, and broader modifications (e.g., barring an entire PLMN or RAT) may be made if the more targeted modification(s) do not result in successfully obtaining cellular service and/or if the cause(s) for the unsuccessful attempt(s) seem to be broader than could be mitigated by a narrowly targeted modification. Additionally or alternatively, the decision of whether to implement modifications to the manner in which the wireless device attempts to obtain celluar service and/or the breadth of the modification(s) may also depend on how often failed attempts to obtain cellular service have recently (e.g., within a predetermined period of time) occurred at the wireless device.

For example, as one possibility, the wireless device may determine one or more features or operations associated with the unsuccessful attempt to obtain cellular service, and potentially one or more features or operations associated with one or more recent previous unsuccessful attempts to obtain cellular service, e.g., in accordance with the determined cause information for those unsuccessful attempts to obtain cellular service. If at least a certain number (e.g., equal to or greater than a predetermined threshold) of recent previous unsuccessful attempts to obtain cellular service are associated with the same feature(s) and/or operation(s), and those feature(s) and/or operations(s) can be disabled while still allowing the device to perform cellular communication, those feature(s) and/or operations(s) may be disabled. The wireless device may operate with this modified operation temporarily or indefinitely, as desired. As one possibility, the wireless device may initiate a timer when the selected feature(s)/operation(s) are disabled, and may cease to disable the selected feature(s)/operation(s) when the timer expires. As another possibility, the wireless device may cease to disable the selected feature(s)/operation(s) when the wireless device enters a different location (e.g., as defined by cell coverage area, tracking area, routing area, mobile country code, GPS coordinates, or in any other desired manner) than the location in which the feature(s)/operation(s) were disabled.

Note that the feature(s)/operation(s) selected to be disabled may or may not be directly used in cellular communication. For example, in some instances, the feature(s)/operation(s) may be aspects of cellular communication, such as a carrier aggregation feature, a specific cell search or measurement operation, and/or any of various other feature(s)/operation(s). In other instances, the feature(s)/operation(s) may be internal to the wireless device, such as a link quality or link health monitoring feature for reporting baseband link quality or health to an application processor of the wireless device, a user interface related feature such as an indication of how many bars of service the wireless device currently has, and/or any of various other possible features/operations relating to a baseband monitoring logic/loop that do not directly participate in cellular communication.

Disabling specific feature(s)/operation(s) may result in subsequent attempts by the wireless device to obtain cellular service being performed without the benefit of those specific feature(s)/operation(s), which may (or may not, e.g., depending on the nature of the feature(s)/operation(s)) have a negative impact on power consumption, communication efficiency, and/or other aspects of device performance, but may nonetheless represent an improvement over total denial of service, and thus may be helpful if a configuration problem or software bug that is specific to a non-essential feature/operation is the cause of denial of service, at least according to some embodiments.

As another possibility, the wireless device may determine to bar a specific cell if it is determined that a certain number of (e.g., equal to or greater than a predetermined threshold, which may be the same as or different than the threshold used with respect to determining whether to disable one or more features/operations) of recent previous unsuccessful attempts to obtain cellular service occurred on that cell. This may be helpful if the problem is cell-specific, since by default, if a wireless device does not change locations, it may find the same cellular tower to be the strongest cell tower in the area and repeatedly try to register with that same tower, potentially resulting in repeated denial of service.

Similar to when disabling one or more feature(s)/operation(s), a timer and/or location based approach to determining when to cease barring the cell may be used, if desired. For example, the cellular tower may be barred from consideration for a configurable period of time. This may result in subsequent attempts by the wireless device to obtain cellular service being performed on a neighbor cell tower from the same or an equivalent operator even if it does not have the highest signal strength and/or highest priority among cells within communication range of the wireless device, which may mitigate the problem if a single (e.g., malicious/rogue) cell is the cause of the denial of service, at least according to some embodiments.

As still another possibility, the wireless device may determine to bar a specific carrier network (e.g., PLMN) if it is determined that a certain number of (e.g., equal to or greater than a predetermined threshold, which may be the same as or different than any of the thresholds previously described herein) of recent previous unsuccessful attempts to obtain cellular service occurred on that network. This may be helpful if the problem is a network-wide configuration problem (e.g., configuration parameters used by the network might expose a software bug in the wireless device, as one possibility), since in such a case the same (e.g., potentially problematic) network configuration may be used by all neighbor cell towers operated by the carrier network, potentially resulting in repeated denial of service on any occasion that the wireless device attempts to obtain service from a cell in that network.

Similar to when disabling one or more feature(s)/operation(s) and barring a cell, a timer and/or location based approach to determining when to cease barring the PLMN may be used, if desired. For example, the PLMN may be barred from consideration for a configurable period of time. This may result in subsequent attempts by the wireless device to obtain cellular service being performed on a neighbor cell tower from a different operator even if it does not have the highest signal strength among cells within communication range of the wireless device, which may mitigate the problem if there are cells available from a network that does not use the problematic configuration, at least according to some embodiments.

As yet another possibility, the wireless device may determine to bar a specific RAT (e.g., LTE, WCDMA, TDSCDMA, GSM, CDMA, EVDO, etc.) if it is determined that a certain number of (e.g., equal to or greater than a predetermined threshold, which may be the same as or different than any of the thresholds previously described herein) of recent previous unsuccessful attempts to obtain cellular service occurred on that RAT. This may be helpful if the wireless device has a problem that is triggered by use of the RAT even between different carrier networks that operate according to the RAT, particularly if the problematic RAT is a high priority RAT that the wireless device may choose by default when available, since in such a case the same problem may potentially result in repeated denial of service even when a lower priority RAT from which cellular service could be obtained might be available.

Similar to when disabling one or more feature(s)/operation(s) and barring a cell or PLMN, a timer and/or location based approach to determining when to cease barring the RAT may be used, if desired. For example, the PLMN may be barred from consideration for a configurable period of time. This may result in subsequent attempts by the wireless device to obtain cellular service being performed on a neighbor cell tower according to a different RAT even if it does not have the highest signal strength or is not the highest priority RAT among cells within communication range of the wireless device, which may mitigate the problem if there are cells available according to a RAT that does not have a problematic configuration, at least according to some embodiments.

It should also be noted that the wireless device could determine to selectively disable one or more features, bar a cell, bar a public land mobile network (PLMN), and/or bar a radio access technology (RAT) based on previous (e.g., recent but not immediate) experience with denial of service based on any of various possible considerations. For example, in some instances, the wireless device may determine that it is in a location at which the wireless device previously experienced denial of cellular service certain features/operations enabled (and/or with a particular cell, network, and/or RAT unbarred) and obtained cellular service with the one or more features/operations disabled (and/or with a particular cell, network, and/or RAT barred) within a predetermined period of time. In such a case, the wireless device may disable features/operations (and/or bar the particular cell, network, and/or RAT) based at least in part on determining that the wireless device is in the location of the previously experienced denial of cellular service.

In 510, the wireless device may attempt to obtain cellular service with the selected feature(s) disabled, cell(s) barred, PLMN(s) barred, and/or RAT(s) barred. The attempt may result in successfully obtaining cellular service, or may be a further unsuccessful attempt to obtain cellular service. According to some embodiments, if the attempt is unsuccessful, the wireless device may determine to broaden the scope of the modifications to its operation for a subsequent attempt to obtain cellular service.

For example, as previously noted, the wireless device may take a progressively aggressive approach to such disabling/barring. Thus, as one possibility, a lower threshold number of failed attempts to obtain cellular service associated with a specific feature may trigger disabling of that feature than a threshold number of failed attempts to obtain cellular service associated with a specific cell that triggers barring of that cell. Similarly, a lower threshold number of failed attempts to obtain cellular service associated with a specific cell may trigger barring of that cell than a threshold number of failed attempts to obtain cellular service associated with a specific PLMN that triggers barring of that PLMN, and/or than a threshold number of failed attempts to obtain cellular service associated with a specific RAT that triggers barring of that RAT.

If such an approach is used, if may be the case that the wireless device makes several successive attempts to obtain cellular service, initially with just selected feature(s) disabled, then also with a specific cell barred, then also with a specific RAT barred, and/or then also with a specific PLMN barred. Note that if a specific PLMN is barred, it may be the case that any RAT barring previously implemented may be removed, e.g., so that the wireless device can attempt to obtain service on another PLMN's available RAT(s), at least according to some embodiments. Such an approach may allow the wireless device to attempt to minimize the overall impact to device performance, e.g., by first attempting to obtain cellular service with the modifications to device operation that result in the least overall impact to device performance, and only gradually increasing the scope of the modifications to device operation as needed to avoid repeated denial of service.

It should also be noted that any number of variations on or alternatives to such an approach may also or alternatively be used. For example, while in some embodiments certain features may be targeted first (e.g., before attempt to bar a cell/RAT/PLMN) for disabling when attempting to avoid denial of service as being considered to potentially have the least overall impact on device performance, in other instances barring a specific cell may be considered to potentially have less overall impact on device performance than disabling features/operations of the wireless device. The determination of the relative priority/impact of potentially disabling features, barring cells, barring PLMNs, and/or barring RATs may be made in any desired manner, and in some instances may vary from feature/operation to feature/operation (e.g., as some features/operations may be more impactful to device performance than others), cell to cell (e.g., in view of the relative signal strength/quality of available cells or the lack of alternative available cells), network to network (e.g., based on network priority level, the availability of cells belonging to other networks in the vicinity of the wireless device, etc.), and/or RAT to RAT (e.g., based on RAT priority level, the availability of cells belonging to other RATs in the vicinity of the wireless device, etc.).

The attempt to obtain cellular service may be successful if/when the wireless device has successfully implemented a workaround to the cause of the denial of service. Thus, if a specific feature was the cause of the denial of service and the specific feature has been disabled, the wireless device may successfully obtain cellular service. Similarly, if a specific cell/network/RAT was the cause of the denial of service and the specific cell/network/RAT has been barred, the wireless device may successfully obtain cellular service.

As previously noted, the selective feature/operation disabling and/or cell/network/RAT barring may be implemented on a temporary/limited basis, e.g., for a configurable period of time and/or based on the location of the wireless device, at least according to some embodiments. Thus, if a timer associated with disabling a feature/operation or barring a cell/network/RAT expires, the wireless device may cease to disable a feature/operation or bar the cell/network/RAT. Similarly, if the wireless device moves to a different location than the location associated with disabling a feature/operation or barring a cell/network/RAT, the wireless device may cease to disable the feature/operation or bar the cell/network/RAT. This may allow the wireless device to resume (or attempt to resume) normal operation and potentially improve overall device performance in case the cause of the denial of service is no longer present (e.g., a configuration error or software bug has been remedied, the wireless device has moved away from a problem cell, etc.). Note, however, that in case the cause of the denial of service is still present (or a different cause of denial of service is present), any or all aspects of the method of FIG. 5 may be repeated to potentially again avoid denial of service, which may again result in one or more features/operations disabled and/or one or more cells/networks/RATs barred for a further period of time.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a hardware processing element configured to cause a wireless device to:
determine that an error has occurred at the wireless device causing denial of cellular service for a first cell;
disable one or more features at the wireless device based at least in part on cause information of the error,
wherein the cause information comprises at least one of: at least one crash signature, an indication of a baseband operation active at the time of the denial of cellular service, an indication of a feature that caused the denial of cellular service, an indication of a configuration error, an indication of a software bug, an indication of a radio access network in use at the time of the denial of cellular service, or an indication of a public land mobile network of the first cell;
attempt to obtain cellular service with the first cell with the one or more features disabled,
wherein if the wireless device is unable to obtain cellular service with the first cell with the one or more features disabled, the processing element is further configured to cause the wireless device to:
bar the first cell based at least in part on being unable to obtain cellular service from the determined cell; and
attempt to obtain cellular service with another cell while the first cell is barred.

2. The apparatus of claim 1, wherein if the wireless device is unable to obtain cellular service while the first cell is barred, the processing element is further configured to cause the wireless device to:
determine a radio access technology with which the wireless device attempted to obtain cellular service;
bar the determined radio access technology based at least in part on being unable to obtain cellular service with the determined radio access technology; and
attempt to obtain cellular service while the determined radio access technology is barred.

3. The apparatus of claim 1, wherein if the wireless device is unable to obtain cellular service while the first cell is barred, the processing element is further configured to cause the wireless device to:
determine a public land mobile network with which the wireless device attempted to obtain cellular service;
bar the determined public land mobile network based at least in part on being unable to obtain cellular service with the determined public land mobile network; and
attempt to obtain cellular service while the determined public land mobile network is barred.

4. The apparatus of claim 1,
wherein the processing element is configured to cause the wireless device to disable the one or more features at the wireless device further based at least in part on a number of errors having a same error type that have occurred at the wireless device causing denial of cellular service within a predetermined period of time.

5. The apparatus of claim 1, wherein the processing element is further configured to cause the wireless device to:
enable the one or more features at the wireless device after a predetermined period of time or after the wireless device moves to a new location.

6. The apparatus of claim 1, wherein the processing element is further configured to cause the wireless device to:
   determine that the wireless device is in a location at which the wireless device previously experienced denial of cellular service with the one or more features enabled and obtained cellular service with the one or more features disabled within a predetermined period of time; and
   disable the one or more features at the wireless device based at least in part on determining that the wireless device is in a location at which the wireless device previously experienced denial of cellular service with the one or more features enabled and obtained cellular service with the one or more features disabled within the predetermined period of time.

7. A wireless device, comprising:
   an antenna;
   a radio coupled to the antenna; and
   a processing element coupled to the radio;
   wherein the device is configured to:
      determine that the wireless device has crashed;
      determine cause information for the crash;
      determine a number of previous occasions on which the wireless device has crashed within a predetermined period of time;
      determine cause information for the previous occasions on which the wireless device has crashed within the predetermined period of time; and
      attempt to obtain cellular service with one or more of:
         one or more features related to the cause information for the crash disabled;
         a cell on which the crash occurred barred;
         a public land mobile network of a cell on which the crash occurred barred; or
         a radio access technology in use when the crash occurred barred.

8. The wireless device of claim 7,
   wherein the wireless device is further configured to select whether to attempt to obtain cellular service with one or more of features related to the cause information for the crash disabled, a cell on which the crash occurred barred, a public land mobile network of a cell on which the crash occurred barred, and/or a radio access technology in use when the crash occurred barred based at least in part on the number of previous occasions on which the wireless device has crashed within the predetermined period of time and further based at least in part on the cause information for the crash and the cause information for the previous occasions on which the wireless device has crashed within the predetermined period of time.

9. The wireless device of claim 7,
   wherein the attempt to obtain cellular service is made with the one or more features related to the cause information for the crash disabled if the one or more features are also related to cause information for at least a predetermined number of previous occasions on which the wireless device has crashed within the predetermined period of time.

10. The wireless device of claim 7,
    wherein the attempt to obtain cellular service is made with the cell on which the crash occurred barred if at least a predetermined number of previous occasions on which the wireless device has crashed within the predetermined period of time also occurred with the same cell.

11. The wireless device of claim 7,
    wherein the attempt to obtain cellular service is made with the public land mobile network of the cell on which the crash occurred barred if at least a predetermined number of previous occasions on which the wireless device has crashed within the predetermined period of time also occurred with the public land mobile network.

12. The wireless device of claim 7,
    wherein the attempt to obtain cellular service is made with the radio access technology in use when the crash occurred barred if at least a predetermined number of previous occasions on which the wireless device has crashed within the predetermined period of time also occurred with the radio access technology in use when the crash occurred.

13. A wireless device comprising:
    an antenna;
    a radio coupled to the antenna; and
    a processing element coupled to the radio;
    wherein the wireless device is configured to:
       determine that an error has occurred at the wireless device causing denial of cellular service for a first cell;
       disable one or more features at the wireless device based at least in part on cause information of the error,
    wherein the cause information comprises at least one of:
       at least one crash signature, an indication of a baseband operation active at the time of the denial of cellular service, an indication of a feature that caused the denial of cellular service, an indication of a configuration error, an indication of a software bug, an indication of a radio access network in use at the time of the denial of cellular service, or an indication of a public land mobile network of the first cell;
       attempt to obtain cellular service with the first cell with the one or more features disabled,
    wherein if the wireless device is unable to obtain cellular service with the first cell with the one or more features disabled, the processing element is further configured to cause the wireless device to:
       bar the first cell based at least in part on being unable to obtain cellular service from the determined cell; and
       attempt to obtain cellular service with another cell while the first cell is barred.

14. The wireless device of claim 13, wherein if the wireless device is unable to obtain cellular service while the first cell is barred, the wireless device is further configured to:
    determine a radio access technology with which the wireless device attempted to obtain cellular service;
    bar the determined radio access technology based at least in part on being unable to obtain cellular service with the determined radio access technology; and
    attempt to obtain cellular service while the determined radio access technology is barred.

15. The wireless device of claim 14, wherein if the wireless device is unable to obtain cellular service while the first cell is barred, the wireless device is further configured to:
    determine a public land mobile network with which the wireless device attempted to obtain cellular service;
    bar the determined public land mobile network based at least in part on being unable to obtain cellular service with the determined public land mobile network; and
    attempt to obtain cellular service while the determined public land mobile network is barred.

16. The wireless device of claim 13, wherein said disabling the one or more features at the wireless device is further based at least in part on a number of errors having a same error type that have occurred at the wireless device causing denial of cellular service within a predetermined period of time.

17. The wireless device of claim 13, wherein the wireless device is further configured to:
enable the one or more features at the wireless device after a predetermined period of time or after the wireless device moves to a new location.

18. The wireless device of claim 13, wherein the wireless device is further configured to:
determine that the wireless device is in a location at which the wireless device previously experienced denial of cellular service with the one or more features enabled and obtained cellular service with the one or more features disabled within a predetermined period of time; and
disable the one or more features at the wireless device based at least in part on determining that the wireless device is in a location at which the wireless device previously experienced denial of cellular service with the one or more features enabled and obtained cellular service with the one or more features disabled within the predetermined period of time.

* * * * *